(No Model.)

D. P. DURHAM.
NAIL.

No. 346,148. Patented July 27, 1886.

Attest.
C. W. Miles
John O. Sloan

Inventor.
Daniel P. Durham
By Geo. J. Murray
His Atty

UNITED STATES PATENT OFFICE.

DANIEL P. DURHAM, OF WITHAMSVILLE, OHIO.

NAIL.

SPECIFICATION forming part of Letters Patent No. 346,148, dated July 27, 1886.

Application filed November 25, 1885. Serial No. 183,931. (No model.)

*To all whom it may concern:*

Be it known that I, DANIEL P. DURHAM, a citizen of the United States, and a resident of Withamsville, in the county of Clermont and State of Ohio, have invented a certain new and useful Improvement in Concealed Nails, of which the following is a specification.

My invention is an improved means for securing the wood finish onto pilasters, casings of buildings, and other similar positions.

Heretofore it has been proposed to make concealed fastening devices with points to be driven into the casings, said points being either plain or screw-threaded, and having a collar integral with the nail, intervening between the opposite ends of the nail.

My invention consists in making a nail angular upon one end and round upon the other, the diameter of the rounded part being less than the distance between the opposite angles, to leave angles projecting, so as to bear upon a loose collar stamped out of light sheet metal when the screw-point is driven home.

Figure 1:
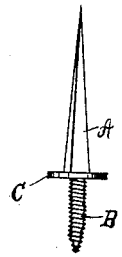
Figure 2:
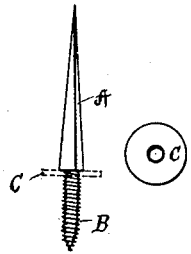

In the accompanying drawings, Figure 1 is an edge elevation of a nail embodying my invention. Fig. 2 is a similar view with the loose collar shown detached and in plan view.

In Fig. 2 the parts A and B are made in one piece, and the collar or burr C is a separate piece stamped out of light sheet metal. In this form the screw B is slightly smaller than the base of the part A, forming a shoulder, which rests upon the collar C when it is placed in position shown in dotted line.

In using my device the screw is driven into the casing and the collar C countersunk even with or slightly below the face. After a sufficient number of these are driven into the casing or pilaster, leaving the points A projecting out, the finishing molding or piece is driven down upon these points, the nails of course not coming through to the surface. By this means I am enabled to have a perfectly smooth unbroken surface on the outside, which is very desirable, especially when a building or other article is varnished or oiled to leave the natural-wood finish, as there are no nail-holes to putty up or conceal.

It is of course obvious that the shank B may be barbed instead of screw-threaded, or even left plain when the parts to be secured are not liable to much strain.

What I claim is—

The fastening device consisting of the single piece A B, the base of the part A projecting beyond the body of the part B adjacent to it, in combination with the loose collar C, to fit over the part B and rest against the projecting shoulder of the part A, substantially as shown and described.

DANIEL P. DURHAM.

Witnesses:
F. P. WITHAM,
A. C. BRADBURY.